United States Patent Office 3,703,438
Patented Nov. 21, 1972

3,703,438
METHOD FOR THE STABILIZATION OF BLOOD
Stepan Ilich Dovgalev, Igor Nikolaevich Ermolenko, Evgeny Danilovich Buglov, Ivan Petrovich Danilov, and Mikhail Lvovich Longin, Minsk, U.S.S.R., assignors to Belorussky Institut Perelivania Krovi, Minsk, U.S.S.R.
No Drawing. Filed Apr. 8, 1969, Ser. No. 814,458
Int. Cl. A61k 27/10
U.S. Cl. 195—1.8       5 Claims

ABSTRACT OF THE DISCLOSURE

Stabilization of blood by binding the calcium ions contained therein in the form of an insoluble complex by passing the blood into contact with an anticoagulant comprising insoluble salts of acid esters of cellulose selected from the group consisting of salts of carboxylic acid esters of cellulose, salts of acid esters of cellulose with an inorganic acid containing an organic cation, mixtures of the same with each other, and mixtures of the same with inorganic salts of acid inorganic esters of cellulose. To improve storage stability conservants may be introduced into the decalcified blood. Also, antiseptic agents such as levomycetin can be included. The acid esters may be prepared by reacting cellulose, for example, in the form of medical gauze, with the acids followed by converting the resultant acid esters into salts with salt solutions.

---

This invention relates to methods of blood stabilization which involve the employment of derivatives of acids to combine chemically the calcium ions.

Known in the art are methods of stabilization (preventing the coagulation) of donated blood by incorporating thereinto soluble compounds capable of forming stable, soluble complexes with calcium (one of the components of the clotting system in blood), the complexing compounds used being citric acid and salts thereof, sodium phosphate, sodium salt of ethylenediamine tetraacetic acid (EDTA-Na), sodium trihydroxyglutarate, etc.

It is also known to effect blood stabilization by binding calcium ions through the agency of cation exchange resins, such as Ky–2 resin, Amberlite IR12, Amberlite IR100, Catechs–5, Dowex 50, etc.

The prior art techniques for stabilizing blood which involve the incorporation of foreign anticoagulants into the blood have a disadvantage in that the chemical anticoagulants are not entirely harmless to patients. As evidenced by numerous experimental observations, even the most extensively used anticoagulant, sodium citrate, is not devoid of toxicity which is particularly pronounced during rapid heavy transfusions of citrate-stabilized blood and even as a result of conventional transfusion to some categories of patients.

Another disadvantage of the above methods is that the incorporation of anticoagulants exerts an adverse effect on the physiological intactness of the formed elements.

The prior art techniques for stabilizing blood which involve the use of synthetic resins have a limitation in that the blood being treated elutes toxic components remaining in the resin after its synthesis as well as the products of resin disintegration, which toxic components and disintegration products are responsible for undesirable inotropic effects on the patient's heart and also intoxicate tissue cultures.

Transfusion of the blood stabilized by means of resins involves a high percentage of post-transfusion reactions, predominantly of pyrogenic and allergic nature.

Another disadvantage of using resins for the stabilization of blood stems from the fact that the equipment for blood collection is relatively elaborate.

A further disadvantage of these techniques is that the cation exchanger column offers marked hydrodynamic resistance to the blood stream collected from a donor and requires the employment of significant quantities of ion exchange resin.

The most promising methods of the anticoagulation of blood seem to involve combining calcium in the form of an insoluble complex by a sorbent, through which the blood being treated is passed and the present inventors have previously suggested that the calcium contained in the blood be combined into an insoluble complex with a non-toxic carbohydrate derivative—the sodium salt of cellulose hydrogen phosphate. This method makes it possible to collect blood containing no toxic substances.

In medical practice, different types of blood transfusion call for the employment of various anticoagulants which would make it possible, due to their dissimilar sorption characteristics, to obtain the stabilized blood of a desired ionic composition and pH, an additional requirement imposed on anticoagulants being the possibility of introducing requisite dosages of antibiotics into the blood and of controlling the amount of sodium that pass into the blood.

With different sorbents the ionic composition of the blood varies depending upon the sorbent used, since, apart from the sorption of calcium ions there takes place the removal of varying amounts of other cations from the blood. However, where complexing sorbents exhibit selectivity towards calcium ions, the content of other ions in the blood is but insignificantly affected.

Accordingly, it is an object of the present invention to provide a wider range of cellulose-base sorbents for the stabilization of blood.

This and other objects have been accomplished by the provision of a method for the stabilization of blood by combining calcium ions with acid derivatives wherein calcium ions are bound by insoluble salts of carboxylic acid esters of cellulose or with salts of an inorganic acid containing an organic cation taken either alone or in combination, or by a mixture of said compounds with inorganic salts of acid inorganic esters of cellulose.

In order to introduce into the blood being treated an antiseptic agent, it is expedient to employ a mixed salt of cellulose dihydrogen citrate, in which the cations are sodium ions and trypaflavine. Use can also be made of a mixed salt of cellulose dihydrogen phosphate, in which the cations are sodium ions and levomycetin.

Where it is desired to adjust the ionic composition and pH of the blood and also to vary the hydrodynamic resistance of the sorbent, recourse may also be had to the sodium salt of mixed phosphoric and citric acid ester of cellulose.

The incorporation of conservants (glucose, etc.) into the decalcified blood increases its shelf life, the roll of conservants being to sustain the viability of blood cells.

The aforesaid anticoagulants. like the prior art sodium salt of cellulose hydrogen phosphate, react with the calcium ions of blood in the same manner as do the conventional anticoagulants, e.g. citric acid or sodium citrate, incorporated directly into the blood, but, in contrast to these prior art complexing agents, the complexing agents of the present invention combine the calcium ions in the form of an insoluble complex and, hence, effect decalcification while a stream of the blood being treated flows therethrough.

The aforesaid derivatives of acids and cellulose may be used in the form of gauze.

Acid esters of cellulose are prepared by reacting cellulose in the form of, say, medical gauze, with organic or inorganic acids, followed by converting the resultant acid esters into salt by using salts solutions, e.g. sodium chloride solution or levomycetin solution. The overall process may be represented by the following schematic reactions:

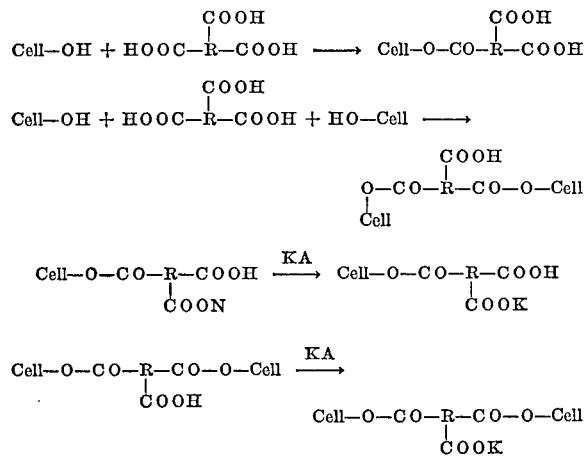

wherein: Cell—a cellulose residue; R—is an acid residue, such as acetic, ethylenediamine tetraacetic or trihydroxyglutaric acid residue, K is a cation, and A is an anion.

The present method is realized in the following manner. The blood, while being withdrawn from the donor, is passed through the aforesaid cellulose esters, which should be preferably wetted prior to blood passage with physiological solution or conservant solution.

The present compounds are noted for their high sorption capacity (1.3 to 3.3 mg.-equiv./g.), so that a small quantity of the sorbent arranged in a bed about 40–40 mm. thick is adequate for anticoagulating the blood flowing through the sorbent by gravity at a rate of up to 100 ml. per minute. When use is made of cation exchange resins to effect the anticoagulation of blood by prior art techniques, the rate of blood flow through such resins is much lower.

No pyrogenic or toxic substances are extracted from the present sorbents, as evidenced by biological assay data obtained with a physiological solution of sodium chloride, in which the aqueous medium consists of an aqueous extract of the aforesaid salts of acid esters of cellulose prepared by autoclaving. The aforesaid salts of cellulose esters and acids are adequately heat stable to withstand sterilization in an autoclave at a pressure of 1.2 atm. for 30 minutes, these salts being also capable of withstanding radiation sterilization.

Morphological and biochemical studies of the blood subjected to anticoagulation treatment according to the present invention have shown the composition of the blood to remain practically unchanged, the only effect being a slight diminution in the content of thrombocytes, potassium and magnesium and a nearly complete removal of calcium.

That the thus anticoagulated blood is physiologically wholesome is indicated by studies devoted to the viability of formed elements (erythrocytes and leucocytes) and to the phagocytic activity thereof and is further corroborated by experimental evidence for the intactness of the blood clotting system. Hence, the freshly collected blood, treated as disclosed hereinbefore, is essentially similar to the native blood.

Hematological, surgical and therapeutic clinical experience has shown the blood, anticoagulated according to the present invention, and components thereof (erythrocytic mass and plasma) to be highly effective transfusion media which are unlike to produce any untoward reaction in the organism of the recipient, no limitations being imposed on the rate of transfusion, and additional incorporation of calcium preparations being dispensed with.

Transfusions of the freshly collected blood, according to present invention, may be successfully resorted to in place of direct transfusions.

It is expedient to use the anticoagulated blood of the present invention for heavy transfusions, in which case, contrary to the effects produced by blood containing chemical anticoagulants, no overloads are imposed on the right-hand part of the recipient's heart, for carrying out exchange transfusions, for the treatment of hemorrhagic and traumatic shocks, for transfusions to recipients exhibiting enhanced reactivity, and also in all instances where the employment of blood stabilized by the addition of citric acid, sodium citrate, etc. is indicated.

Exchange transfusions may be conducted at any desired rate and involve no noticeable pathological changes even where calcium preparations are also introduced.

High stability of the erythrocytes in the anticoagulated blood of the present invention to mechanical effects in the course of extracorporeal blood circulation and also the closeness of the pH of the anticoagulated blood to that of the recipient's blood make it possible to employ the blood, stabilized in accordance with the present method and stored for a period of up to 5 days in the presence of conservants, in artificial blood circulation apparatus in place of freshly heparinized blood. The blood, stabilized according to the invention, can be used for transfusions, provided conservants are incorporated thereinto, for a period of 20–25 days. The biological adequacy of this blood, as evidenced by evaluations of morphological and biochemical characteristics and also by data on the survival of erythrocytes, is superior to that of blood stabilized by the addition of sodium citrate or citric acid, the most extensively used prior art anticoagulants.

Simplicity of the devices for accomplishing the present method, availability and unsophisticated synthesis of the aforesaid salts of acid esters of cellulose, the possibility of employing said cellulose derivatives in small amounts, and the practicability of manufacturing commercially not only the anticoagulants of the present invention, but also the sterilized blood-withdrawing systems containing said anticoagulants, are clearly indicative of the advantages of the present method.

The present invention makes it possible to employ the anticoagulant preparation and the blood-collecting system (device) on a throw-away basis and also to effect the preparation of anticoagulated blood containing no chemical anticoagulants on any desired scale.

For a better understanding of the present invention, the following examples are given by way of illustration.

EXAMPLE 1

200 ml. of blood is withdrawn by means of a conventional device whose tube incorporates an ampoule packed with an anticoagulant preparation, through which the blood being collected flows from the donor's vein to a graduated glass bottle. The anticoagulant preparation in the form of gauze is used in an amount of 5 g. and comprises the sodium salt of cellulose hydrogen citrate, the exchange capacity of the anticoagulant being 1.36 mg.-equiv./g.

Prior to blood collection, the assembled system is sterilized in an autoclave at 1.2 atm. for 30 min.

Immediately before blood withdrawal, the anticoagulant preparation is wetted with a back stream of a conservant placed in the bottle, the conservant being a 3% solution of glucose in 0.9% sodium chloride solution.

Blood analysis data are listed in the table set forth hereinafter.

After a 4-day storage period at 4° C., the collected blood has the following external characteristics: the plasma is of straw-yellow colour with no visible signs of haemolysis; films or flocs are absent; and the boundary between formed elements and plasma is distinct.

When transfused to a patient by the technique, the blood exerts a beneficial effect.

The anticoagulant preparation used, viz, the sodium salt of cellulose hydrogen citrate is prepared by treating gauze with citric acid, under elevated temperature, followed by reacting the resultant cellulose hydrogen citrate with sodium chloride. The overall reaction may be represented by the following equations:

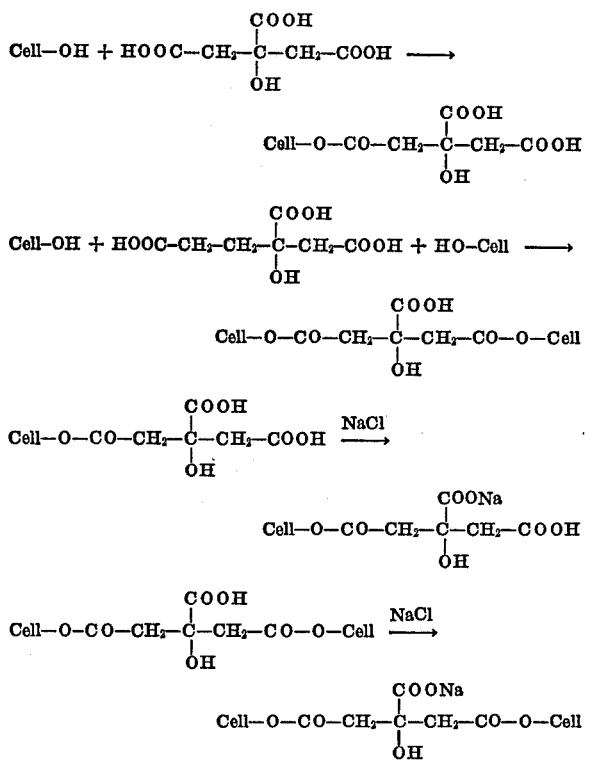

wherein Cell stands for a cellulose residue.

EXAMPLE 2

Blood withdrawal is carried out as described in Example 1, but the anticoagulant preparation in the form of gauze consists of 6 g. of the sodium salt of acid ethylenediamine tetraacetic ester of cellulose; the sorption capacity of the anticoagulant preparation used equals 1.03 mg.-equiv./g.

The anticoagulated blood has a composition identical to that of the blood of Example 1, but the pH is 7.4.

EXAMPLE 3

Blood withdrawal is carried out as disclosed in Example 1, with the difference that the anticoagulant preparation in the form of gauze weighs 5 g. and comprises the sodium salt of cellulose hydrogen nitrilotriacetate, the exchange capacity of the anticoagulant preparation being 1.49 mg.-equiv./g.

The collected blood was transfused after a 1day storage period.

EXAMPLE 4

Blood withdrawal is carried out as disclosed in Example 1, with the difference that the anticoagulant preparation in the form of gauze weighs 5 g. and comprises the sodium salt of cellulose hydrogen ethylenediamine tetraacetate (3 g.) and the sodium salt of cellulose hydrogen phosphate (2 g.) arranged in alternating layers. The exchange capacity of cellulose hydrogen phosphate equals 3.2 mg.-equiv./g.

The collected blood was transfused after a 10-day storage period at 4° C.

EXAMPLE 5

Blood withdraw is accomplished by following the procedure of Example 1, with the difference that the anticoagulant preparation in the form of gauze consists of the mixed sodium-levomycetin salt of cellulose hydrogen phosphate. Bacteriological tests corroborate that the stabilized blood contains an antiseptic (levomycetin) in an amount that corresponds to the antibiotic concentration employed in known formulations, such as ZOLIPK 7δ formulation.

The morphological and biochemical composition of the blood after the anticoagulation treatment corresponds to that of the blood of Example 1, except for acidity and ionic composition.

EXAMPLE 6

Blood withdrawal is carried out by following the procedure of Example 1, with the difference that the anticoagulant preparation used comprises the mixed sodium-trypaflavine salt of cellulose hydrogen citrate, a further distinctive feature being that the blood collecting bottle contains a physiological solution of sodium chloride (50 ml.) in place of conservant.

The blood was transfused after a 5-day storage.

EXAMPLE 7

Blood withdrawal is conducted as disclosed in Example 1, with the difference that the blood collecting bottle contains a conservant solution having the following composition: glucose, 1.5 g.; 2.5 g. of saccharose; levomycetin, 7.5 mg., and distilled water, 50 ml.

The blood was transfused after a 25-day storage.

EXAMPLE 8

Blood withdrawal is conducted as disclosed in Example 1, with the difference that the blood collecting bottle contains a conservant solution having the following composition: glucose, 1.5 g.; sodium hydrogen phosphate, 0.75 g.; levomycetin, 7.5 mg.; and distilled water, 50 ml.

The blood was transfused after a 21-day storage at 4° C.

EXAMPLE 9

Blood withdrawal is conducted as disclosed in Example 1, with the difference that the anticoagulant preparation comprises the sodium salt of mixed phosphoric acid and citric ester of cellulose (sodium salt of cellulose hydrogen phosphate-citrate), the exchange capacity of the anticoagulant preparation being 2.7 mg. equiv./g.

The blood collected into 16 bottles was stored for 3 days at 4° C.

The collected blood was used in an artificial blood circulation apparatus for cardiac surgery. The amount of unbound hemoglobin in the blood plasma after a 30-minute blood residence time in the apparatus was 38 mg. per 100 ml., and that of potassium, 27 mg. per 100 ml.

TABLE

| Blood | Hemoglobin, g./100 ml. | Erythrocytes, millions per mm.³ | Free hemoglobin of plasma, mg./100 ml. | Number of leocytes per mm.³ | Percent of viable leucocytes | Thrombocytes, thousands per mm.³ | Protein, g./100 ml. | Fibrinogen, g./100 ml. | pH | Na, mg./100 ml. | K, mg./100 ml. | Mg, mg./100 ml. | Ca, mg./100 ml. |
|---|---|---|---|---|---|---|---|---|---|---|---|---|---|
| Starting blood | 9.2 | 3.86 | 1.8 | 5,750 | 96 | 228 | 6.82 | 0.35 | 7.34 | 389 | 16.4 | 3.4 | 10.4 |
| Blood after passage through anticoagulant preparation | 9.2 | 3.83 | 1.8 | 5,250 | 98 | 160 | 6.82 | 0.35 | 7.23 | 378 | 10.8 | 2.1 | 0.3 |

We claim:

1. A method for the stabilization of blood which comprises binding the calcium ions contained therein in the form of an insoluble complex by means of passing the blood into contact with an anticoagulant comprising the mixed salt of cellulose hydrogen citrate with sodium cations and trypaflavine.

2. A method for the stabilization of blood which comprises binding the calcium ions contained therein in the form of an insoluble complex by means of passing the blood into contact with an anticoagulant comprising the mixed salt of cellulose hydrogen phosphate with sodium cations and levomycetin.

3. A method for the stabilization of blood which comprises binding the calcium ions contained therein in the form of an insoluble complex by means of passing the blood into contact with an anticoagulant comprising the sodium salt of cellulose hydrogen phosphate-citrate.

4. A method for the stabilization of blood which comprises binding the calcium ions contained therein in the form of an insoluble complex by means of passing the blood into contact with an anticoagulant selected from the group consisting of the sodium salt of cellulose hydrogen citrate, the sodium salt of ethylenediamine tetraacetic acid ester of cellulose, the sodium salt of cellulose hydrogen nitrilotriacetate, the sodium salt of cellulose hydrogen ethylenediamine tetraacetate arranged in alternating layers with the sodium salt of cellulose hydrogen phosphate, the mixed sodium-levomycetin salt of sodium hydrogen phosphate, the mixed sodium-trypaflavine salt of cellulose hydrogen citrate and the sodium salt of cellulose hydrogen phosphate-citrate.

5. A method according to claim 4 wherein the decalcified blood is collected in a container having therein a material selected from the group consisting of physiological saline and conservants.

References Cited

UNITED STATES PATENTS 2,833,691    5/1958    Klaas et al. _____ 195—1.8
3,238,192    3/1966    Taylor _____ 260—212

OTHER REFERENCES

Chemical Abstracts, vol. 66, entry 118821j, 1967.
Chemical Abstracts, vol. 70, entry 80815c, 1969.

RICHARD L. HUFF, Primary Examiner